(12) United States Patent
Dannwolf et al.

(10) Patent No.: US 11,053,987 B2
(45) Date of Patent: Jul. 6, 2021

(54) FRICTION DISK AND FRICTIONALLY ACTING DEVICE WITH SUCH A FRICTION DISK

(71) Applicant: BorgWarner Inc., Auburn Hills, MI (US)

(72) Inventors: Florian Oliver Dannwolf, Mannheim (DE); Volker Reiners, St. Leon-Rot (DE); Tim Traeger, Dossenheim (DE)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 16/408,715

(22) Filed: May 10, 2019

(65) Prior Publication Data

US 2019/0345989 A1 Nov. 14, 2019

(30) Foreign Application Priority Data

May 11, 2018 (DE) .......................... 102018003829.8

(51) Int. Cl.

| F16D 65/12 | (2006.01) |
|---|---|
| F16D 13/72 | (2006.01) |
| F16D 13/52 | (2006.01) |
| F16D 13/68 | (2006.01) |
| F16D 13/64 | (2006.01) |
| F16D 65/02 | (2006.01) |

(52) U.S. Cl.
CPC ............. *F16D 13/72* (2013.01); *F16D 13/52* (2013.01); *F16D 13/648* (2013.01); *F16D 13/683* (2013.01); *F16D 65/127* (2013.01); *F16D 65/128* (2013.01); *F16D 2065/1308* (2013.01); *F16D 2065/1332* (2013.01); *F16D 2300/0212* (2013.01)

(58) Field of Classification Search
CPC ........ F16D 13/72; F16D 13/52; F16D 13/648; F16D 13/683; F16D 65/127; F16D 65/128; F16D 2065/1308; F16D 2065/1332; F16D 2300/0212
USPC .......................................... 188/71.5, 218 XL
See application file for complete search history.

(56) References Cited

U.S. PATENT DOCUMENTS

| 3,972,400 A * | 8/1976 | Howells ................. | F16D 13/60 |
|---|---|---|---|
| | | | 192/107 R |
| 4,995,500 A * | 2/1991 | Payvar .................... | F16D 13/72 |
| | | | 188/218 XL |
| 5,101,953 A * | 4/1992 | Payvar .................... | F16D 13/72 |
| | | | 192/107 R |

(Continued)

FOREIGN PATENT DOCUMENTS

DE 10 2015 214 469 A1 * 2/2017 ........... F16D 13/648

*Primary Examiner* — Thomas W Irvin
(74) *Attorney, Agent, or Firm* — Howard & Howard Attorneys PLLC

(57) ABSTRACT

The present invention relates to a friction disk (2) for a frictionally acting device (78) comprising an annular disk-shaped disk body (18), which has a first edge (30), a second edge (32) facing away from the first edge (30) and with a rotary driving contour (34), and an annular friction surface (26) with a first friction surface edge (36) facing the first edge (30) and a second friction surface edge (38) facing the second edge (32). The first edge (30) and/or the first friction surface edge (36) has a path deviating from a circular path. In addition, the present invention relates to a frictionally acting device (78) with such a friction disk (2).

20 Claims, 4 Drawing Sheets

(56) References Cited

U.S. PATENT DOCUMENTS

Figure 1:
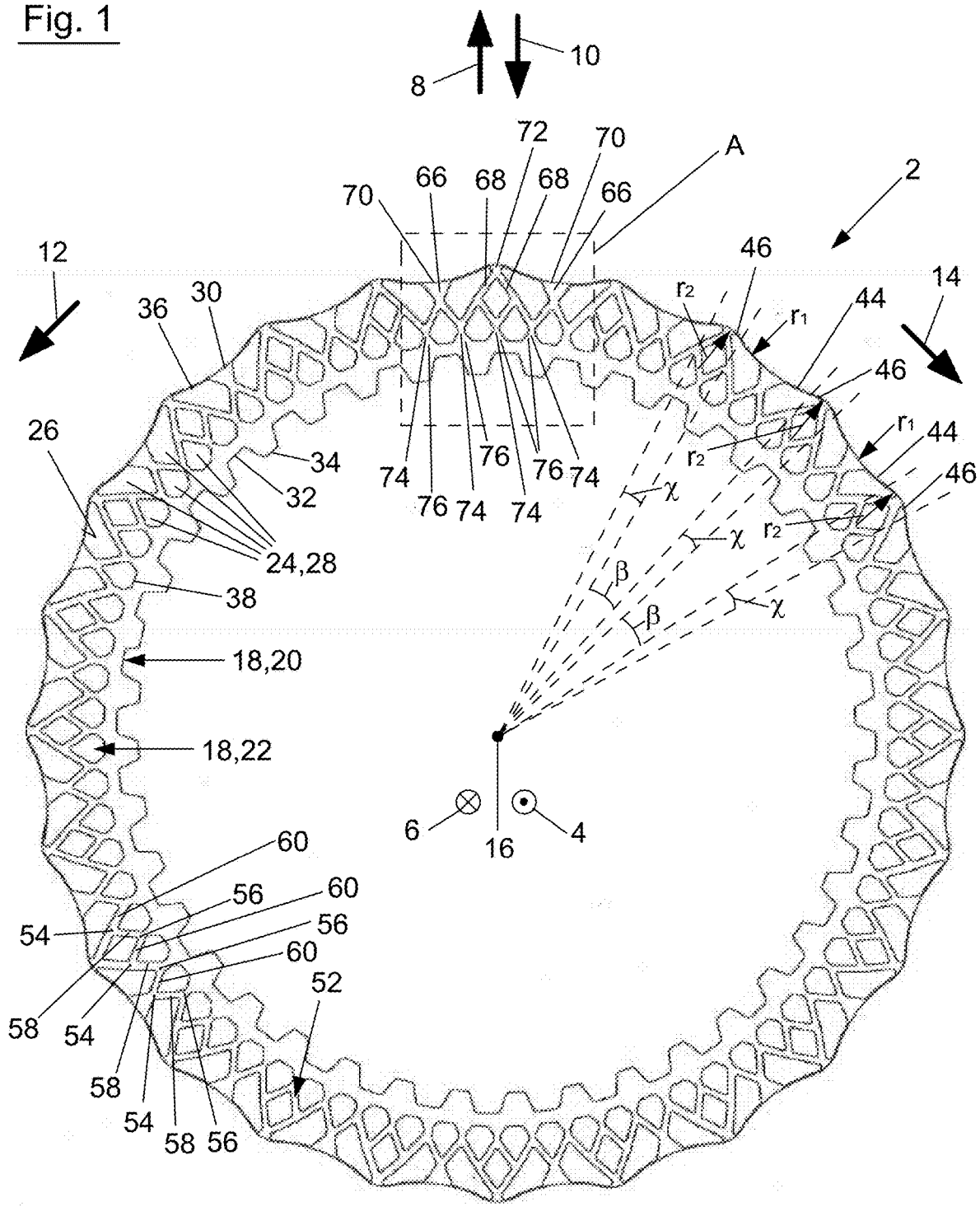

| | | | | |
|---|---|---|---|---|
| 5,176,236 A * | 1/1993 | Ghidorzi | ............... | F16D 13/648 192/107 R |
| 5,460,255 A * | 10/1995 | Quigley | ................ | F16D 13/648 192/113.36 |
| 6,293,382 B1 * | 9/2001 | Nishide | ................... | F16D 13/72 192/107 R |
| 6,712,190 B2 * | 3/2004 | Kitaori | ................. | F16D 13/648 188/264 B |
| 7,284,643 B1 * | 10/2007 | Kao | ........................ | F16D 65/12 188/218 XL |
| 7,331,433 B2 * | 2/2008 | Okabe | ..................... | B62L 1/005 188/218 XL |
| 7,448,483 B2 * | 11/2008 | Arcot | .................. | F16D 13/648 192/107 R |
| 8,474,590 B2 * | 7/2013 | Fabricius | .............. | F16D 13/648 192/107 R |
| 8,893,863 B2 * | 11/2014 | Meckel | ................ | F16D 65/127 188/218 XL |
| 9,022,183 B2 * | 5/2015 | Bill | ....................... | F16D 65/127 188/218 XL |
| 9,109,640 B2 * | 8/2015 | Reiners | ................. | F16D 13/64 |
| 9,139,167 B2 * | 9/2015 | Tokumasu | ............ | F16D 13/648 |
| 9,841,063 B2 * | 12/2017 | Kishimoto | ............ | F16D 13/648 |
| 10,260,570 B2 * | 4/2019 | Takabayashi | ........ | F16D 25/0638 |
| 10,337,598 B2 * | 7/2019 | Bongard | ................. | F16H 48/40 |
| 10,495,157 B2 * | 12/2019 | Reisch | .................... | F16D 13/52 |
| 10,502,269 B2 * | 12/2019 | Takakura | ................ | F16D 13/72 |
| 10,731,712 B2 * | 8/2020 | Ohashi | .................. | F16D 13/648 |
| 2005/0056495 A1 * | 3/2005 | Greppi | .................... | F16D 65/12 188/26 |
| 2008/0041675 A1 * | 2/2008 | Baumgartner | .......... | F16D 65/12 188/218 XL |
| 2009/0101458 A1 * | 4/2009 | Strandberg | ............. | F16D 55/36 188/218 XL |
| 2014/0166427 A1 * | 6/2014 | Youngwerth | ........... | F16D 13/72 192/109 R |
| 2015/0354649 A1 * | 12/2015 | Forssberg | ............... | F16D 13/74 188/218 XL |
| 2016/0160947 A1 * | 6/2016 | Wen | ...................... | F16D 65/128 188/218 XL |
| 2017/0056943 A1 * | 3/2017 | Oezkan | .................. | B21D 53/84 |
| 2017/0350456 A1 * | 12/2017 | Ohashi | .................... | F16D 13/64 |
| 2018/0216673 A1 * | 8/2018 | Gotz | ..................... | F16D 13/648 |
| 2018/0328415 A1 * | 11/2018 | Langenkaemper | ..... | F16D 13/74 |
| 2019/0249737 A1 * | 8/2019 | Hoshino | ................. | F16D 13/72 |
| 2019/0345988 A1 * | 11/2019 | Dannwolf | ............. | F16D 13/74 |
| 2019/0360534 A1 * | 11/2019 | Lanzillotti | ........... | F16D 65/121 |
| 2020/0049206 A1 * | 2/2020 | Tepper | .................... | F16D 13/72 |
| 2020/0049207 A1 * | 2/2020 | Tepper | ................... | F16D 65/128 |
| 2020/0149595 A1 * | 5/2020 | Schaefer | ................ | F16D 65/186 |
| 2021/0010555 A1 * | 1/2021 | Tepper | .................... | F16D 69/00 |

* cited by examiner ced
FRICTION DISK AND FRICTIONALLY ACTING DEVICE WITH SUCH A FRICTION DISK

CROSS-REFERENCE TO RELATED APPLICATIONS

This application claims the benefit of German Patent Application No. 102018003829.8 filed May 11, 2018, the disclosure of which is herein incorporated by reference in its entirety.

DESCRIPTION

The present invention relates to a friction disk for a frictionally acting device comprising an annular disk body, which has a first edge, a second edge facing away from the first edge with a rotary driving contour, and an annular friction surface with a first friction surface edge facing the first edge and a second friction surface edge facing the second edge. In addition, the present invention relates to a frictionally acting device with such a friction disk.

Friction disks are known from practice which are used in frictionally acting devices, for example, disk clutches or disk brakes. The known friction disks have an annular disk body, which has a first edge, for example an edge facing radially outward or radially inward, a second edge with a rotary driving contour facing away from the first edge, thus, for example, an edge facing inward in the radial direction or outward in the radial direction, and an annular friction surface which may be brought into frictional engagement with a friction surface of a counter disk within the frictionally acting device. The annular friction surface is thereby often formed by a friction lining applied onto an annular friction lining carrier and is delimited by a first friction surface edge facing the first edge of the disk body or the friction lining carrier and a second friction surface edge facing the second edge of the disk body or friction lining carrier. The first edge, thus, for example, the first edge of the friction lining carrier, thereby has a circular path. This also applies for the first friction surface edge, even if any openings provided at the first friction surface edge by grooves within the friction surface are disregarded.

It is the object of the present invention to further refine a friction disk of the generic type in such a way that the cooling and heat transfer is improved in a disk set comprising such a friction disk, wherein additionally a reduction of the drag torque in an open frictionally acting device should be achieved. The underlying problem of the present invention additionally includes creating a frictionally acting device with such an advantageous friction disk.

This problem is solved by the features listed in Patent Claim 1 or 10. Advantageous embodiments of the invention are the subject matter of the subclaims.

The friction disk according to the invention is conceived of for a frictionally acting device. Thus, the friction disk may be, for example, a friction disk for a disk clutch or disk brake. The friction disk has a substantially annular disk-shaped disk body. Thus, the disk body may be, for example, made from an annular friction lining carrier and a friction lining applied onto the friction lining carrier. The disk body has a first edge and a second edge facing away from the first edge with a rotary driving contour, for example, a toothing. Thus, the first edge may be, for example, an edge facing outward in the radial direction, while the second edge may be an edge of the disk body facing inward in the radial direction. Conversely, the first edge might also be an edge facing inward in the radial direction and the second edge may be formed as an edge of the disk body facing outward in the radial direction. In the case of a disk body made from a friction lining carrier and a friction lining applied onto the friction lining carrier, the first edge and the second edge are preferably provided on the friction lining carrier. The cited rotary driving contour may function for the rotary driving connection to a disk carrier; however, it should preferably enable an axial displaceability of the disk body relative to the disk carrier. Furthermore, the disk body has an annular friction surface, which may be formed, for example, by the previously mentioned friction lining on the friction lining carrier. The annular friction surface, which may be brought into frictional engagement with a corresponding counter friction surface on a counter disk or the like within a frictionally acting device, is likewise delimited. Thus, the annular friction surface has a first friction surface edge facing the first edge of the disk body and a second friction surface edge facing the second edge of the disk body. The first friction surface edge facing the first edge may thereby be designed as essentially consistent with the first edge or essentially congruent with the first edge, when the friction disk is viewed in a front view. A spacing—even if minor—between the first friction surface edge and the first edge has, however, proven advantageous with respect to wear on the friction disk. The cited first edge has a path deviating from a circular path. Alternatively or supplementally, the first friction surface edge has a path deviating from a circular path. It has been shown that, solely through a first edge with a path deviating from a circular path, a substantial improvement of the cooling or the heat transfer within a disk set may be achieved with a simultaneous reduction of the drag torque in an open frictionally acting device. The listed advantages were indeed also achieved solely through a first friction surface edge with a path deviating from a circular path; however, these advantages were less strongly expressed than in the first case. The advantages were most strongly expressed in a constellation in which both the first edge and also the first friction surface edge had a path deviating from a circular path. The path mentioned here of the first friction surface edge thereby relates to a path of the actual first friction surface edge, thus to its path disregarding any openings at the first friction surface edge from grooves or depressions optionally provided in the friction surface.

In one preferred embodiment of the friction disk according to the invention, the first edge and/or the first friction surface edge has an undulating path in order to reinforce the previously mentioned advantages and to achieve a relatively uniform cooling and reduction of the drag torque. Alternatively or supplementally, the path of the first edge and/or of the first friction surface edge is designed as constant, wherein a constant path of the first friction surface edge—as already previously mentioned—preferably disregards any openings at the first friction surface edge from grooves in the friction surface.

Basically, the first edge and/or the first friction surface edge may have any path deviating from a circular path; however, it has been proven that the advantages listed at the outset are then particularly strongly expressed if the first edge and/or the first friction surface edge have an angle at each point with a circumferential circle, said angle being smaller than 60°, as this is provided in a particularly preferred embodiment of the friction disk according to the invention. In this embodiment, it is additionally preferred if the cited angle is less than 45°, particularly preferably less than 30°.

In one advantageous embodiment of the friction disk according to the invention, the first edge and/or the first friction surface edge have first sections curved in the radial direction toward the friction surface and second sections curved away from the friction section, which follow each other alternating in the circumferential direction. It is thereby preferred if the first sections extend across first circumferential angles and the second sections extend across second circumferential angles, wherein the first circumferential angles and the second circumferential angles are designed as different sizes. In this context, it has proven particularly advantageous with respect to the listed advantages if the first circumferential angle is designed as larger than the second circumferential angle. In addition, it is further advantageous if the first circumferential angle of the first sections is at least twice or at least three times larger than the second circumferential angle of the second sections.

According to one particularly advantageous embodiment of the friction disk according to the invention, the first sections and the second sections are respectively designed as circular arcs. In this context, it has proven advantageous if the first sections have a first circular arc radius and the second sections have a second circular arc radius, wherein the first circular arc radius and the second circular arc radius are designed as different sizes. In order to achieve a particularly good cooling or a particularly good heat transfer within the disk set at a simultaneous reduction of the drag torque, the first circular arc radius of the first section is preferably designed as larger than the second circular arc radius of the second section, wherein in this case a first circular arc radius, that is at least four times or at least five times larger than the second circular arc radius, has proven particularly advantageous.

According to another advantageous embodiment of the friction disk according to the invention, a circumferential groove, which extends in a zig-zag or an undulating fashion between first deflection points and second deflection points, is provided in the friction surface, wherein the second deflection points are farther removed in the radial direction from the first edge and/or from the first friction surface edge than the first deflection points. A circumferential groove may be understood in particular herein as a continuous groove in the circumferential direction, preferably closed in the circumferential direction, particularly preferably designed as annular. The first and second deflection points for a circumferential groove are also preferably spaced apart in the radial direction from the first and second friction surface edges. Furthermore, a plurality of first grooves, which have an opening at the friction surface edge on the one side and open into the circumferential groove on the other side, are provided in the friction surface. In addition, a plurality of second grooves are provided, which have an opening at the second friction surface edge on the one side and open into the circumferential groove on the other side. In the case of a circumferential groove designed in a zig-zag fashion, groove segments are preferably provided, which extend from the first deflection points straight in the circumferential direction to the second deflection points, while the circumferential groove additionally has groove segments, which extend from the second deflection points straight in the same circumferential direction to the first deflection points. In contrast, the first grooves and/or the second grooves are preferably aligned in such a way that they respectively extend along a radial of the friction disk, consequently are not inclined with respect to the radials, whereby it may be advantageous in the case of some first grooves if these are inclined with respect to a radial, as will be discussed again later.

The first and second grooves may basically open into the circumferential groove at any opening points; however, in another advantageous embodiment of the friction disk according to the invention, the first and second grooves are, however, arranged in such a way that they open into the circumferential groove at different opening points, particularly preferably at the deflection points.

In another preferred embodiment of the friction disk according to the invention, at least two first grooves are provided with a common opening at the first friction surface edge. Consequently, the two cited first grooves analogously form a groove pair. The two cited first grooves of this groove pair should also be designed as inclined in respective opposite directions with respect to a radial through the common opening. In this embodiment, it has proven advantageous if the common opening is arranged in the second section of the first edge and/or of the first friction surface edge. In addition, it has proven advantageous if individual first grooves are provided, whose opening at the first friction surface edge is arranged in the first section of the first edge and/or the first friction surface edge.

According to another advantageous embodiment of the friction disk according to the invention, the common openings at the first friction surface edge and the openings of the individual first grooves at the first friction surface edge are arranged in such a way that they follow each other alternating in the circumferential direction.

In another advantageous embodiment of the friction disk according to the invention, the first deflection points are arranged on a first circumferential circle and the second deflection points are arranged on a second circumferential circle, wherein the first and second circumferential circles are arranged concentric to each other.

In another preferred embodiment of the friction disk according to the invention, the first and second grooves—as already indicated above—open into the circumferential groove at the deflection points, wherein the first grooves open into the circumferential groove at the first deflection points and the second grooves at the second deflection points.

In another particularly advantageous embodiment of the friction disk according to the invention, the common opening of the two previously cited first grooves, thus analogously the common opening of the previously mentioned groove pair, has a smaller groove cross section than the opening of the individual first groove arranged in the first section. Alternatively or supplementally, the common opening has a smaller groove cross section than the openings of the second grooves arranged at the second friction surface edge. It has also proven advantageous in this embodiment if the groove cross section of the opening of the previously mentioned individual first groove arranged in the first section is designed as larger than the groove cross section of the openings of the second grooves arranged at the second friction surface edge. In addition, it has proven advantageous if both the individual first groove with the opening arranged in the first section is enlarged in the direction of this opening and/or the second grooves with openings at the second friction surface edge are enlarged in the direction of these opening, particular preferably is/are linearly enlarged.

In another particularly preferred embodiment of the friction disk according to the invention, the disk body, optionally its friction lining carrier, has sections projecting in the radial direction on the basis of the path of the first edge deviating from a circular path, wherein the friction surface is designed at least partially in the region of the projecting sections. It has been shown that the advantages to be achieved by the friction disk according to the invention are particularly strongly expressed by this means.

In another advantageous embodiment of the friction disk according to the invention, the disk body has at least one axially projecting friction section for forming the friction surface, wherein preferably a plurality of friction sections is provided to form the friction surface, between which the circumferential groove, the first grooves, and the second grooves are formed. Basically, the at least one friction section or the plurality of friction sections might thereby be designed as one piece with the disk body. However, it is additionally preferred in this embodiment if the disk body has a friction lining carrier with the first and second edge and a friction lining applied on the friction lining carrier to form the at least one friction section or the plurality of friction sections. The plurality of friction sections might thereby be basically designed as one piece with each other in that the circumferential groove, the first grooves, and/or the second groves are generated in the friction lining without interrupting its coherence, for example, by impressing the listed grooves; however, it is additionally preferred in this embodiment if the friction lining is formed from a plurality of friction lining segments spaced apart from each other to form the plurality of friction sections.

According to another particularly preferred embodiment of the friction disk according to the invention, groove sections of the circumferential groove joined at the first deflection points, optionally also the two first grooves joined at a common opening, define an angle on the side facing the second edge and/or the second friction surface edge, said angle being between 55° and 80°. An angle between 60° and 75°, preferably an angle between 64° and 71° has proven particularly advantageous with respect to cooling and heat transfer in a disk set and has proven advantageous in reducing the drag torque when the frictionally acting device is open. It is also particularly preferred in this embodiment if the angle defined between the listed groove segments of the circumferential groove is smaller—even if only slightly smaller—than the angle defined between the two first grooves which are joined at the common opening.

The frictionally acting device according to the invention, which is preferably a disk clutch or a disk brake, particularly preferably a wet-running disk clutch or disk brake, has a first disk carrier and a second disk carrier. The first disk carrier may thus be designed as an outer or inner disk carrier, while the second disk carrier may be designed in contrast as an inner or outer disk carrier. At least one friction disk, which is a friction disk of the type according to the invention, is arranged on the first disk carrier, while a counter disk is arranged on the second disk carrier and may be brought into frictional engagement with the at least one friction disk in order to achieve a rotary driving connection between the first and second disk carriers. The at least one friction disk is preferably mounted or mountable on the first disk carrier in such a way that it is in rotary driving connection with the first disk carrier, however, is displaceable relative to the first disk carrier in the axial direction. This applies correspondingly for the at least one counter disk, which is preferably mounted or mountable on the second disk carrier in such a way that it is in rotary driving connection with the second disk carrier, however, is displaceable relative to the second disk carrier in the axial direction. With regard to the advantages of the frictionally acting device, reference is made to the previously described advantages of the friction disk according to the invention, which correspondingly apply for the frictionally acting device.

In one preferred embodiment of the frictionally acting device according to the invention, the at least one friction disk is arranged in the axial direction between two counter disks, wherein an arrangement of the two counter disks adjacent to the friction disk may also be stated. In addition, a spring device is arranged between the two counter disks for biasing the two counter disks apart, wherein it is preferred if the spring device is arranged in the radial direction between a disk support section of the second disk carrier and a disk support section of the first disk carrier. A substantially annular wave spring has thereby proven to be a particularly advantageous embodiment variant of the spring device, which may be arranged in a particularly space-saving way between the two counter disks with respect to its radial extension. The first edge and/or the first friction surface of the friction disk thereby faces the spring device. The first edge and/or the first friction surface of the friction disk may thus face the spring device, depending on the design of the friction disk as an inner or outer disk, it faces the spring device outward in the radial direction or inward in the radial direction. In addition, a radial nesting of friction disk and spring device may be referred to. It has been shown, in particular in the described application of the friction disk according to the invention within the frictionally acting device, that the cooling and the heat transfer of the disk set may be substantially improved and simultaneously the drag torque may be reduced in the cases of an open frictionally acting device.

Figure 2:
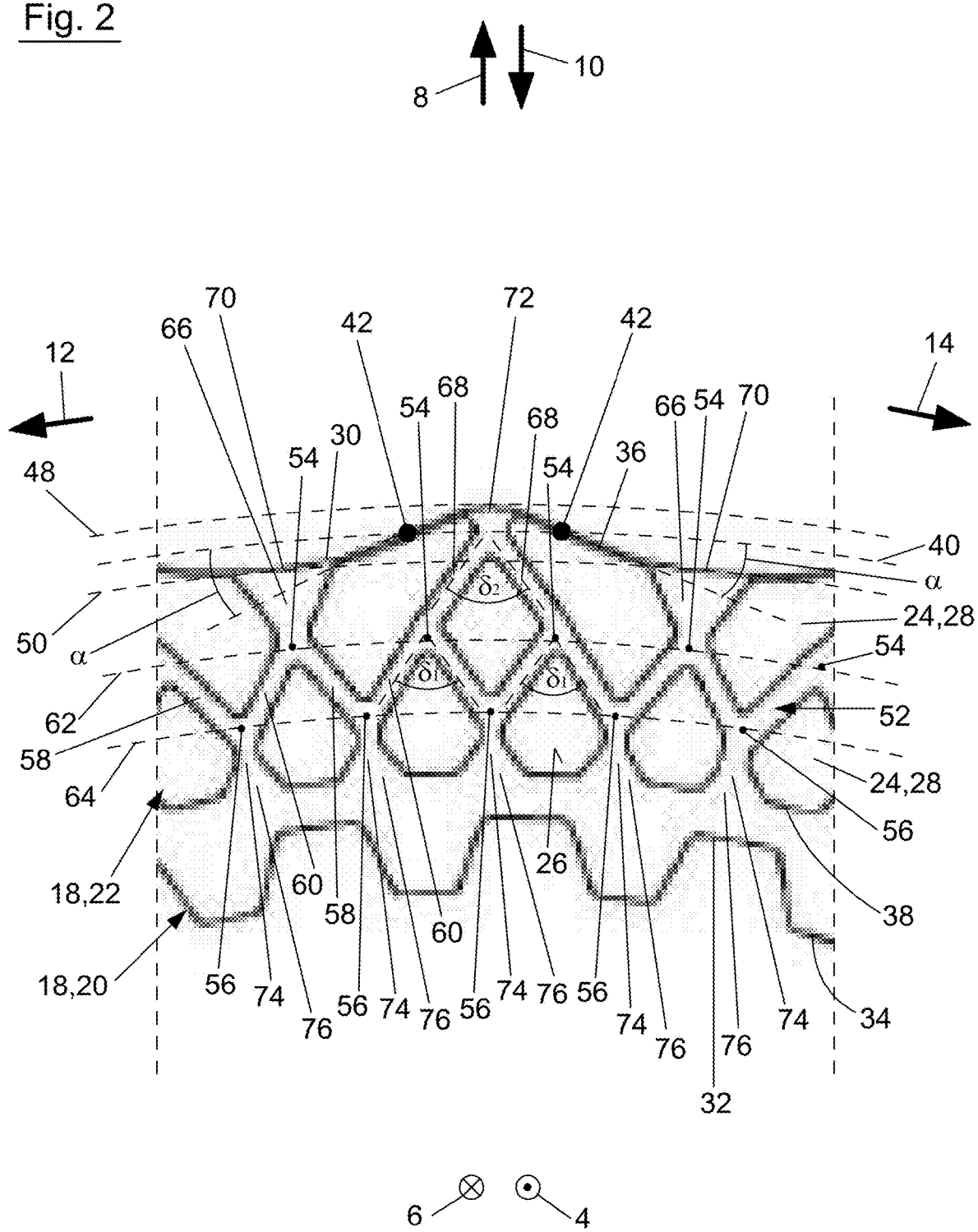
Figure 3:
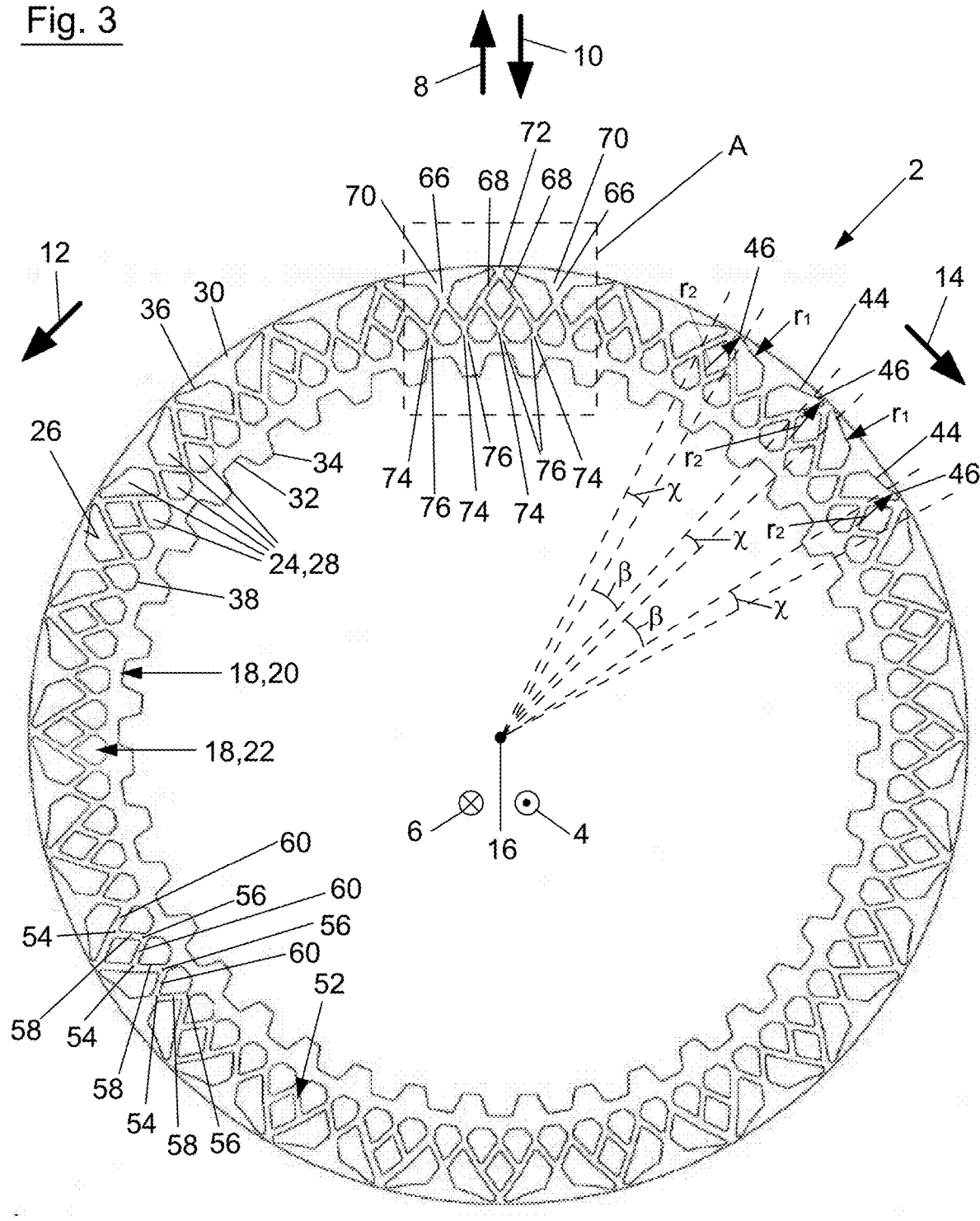
Figure 4:
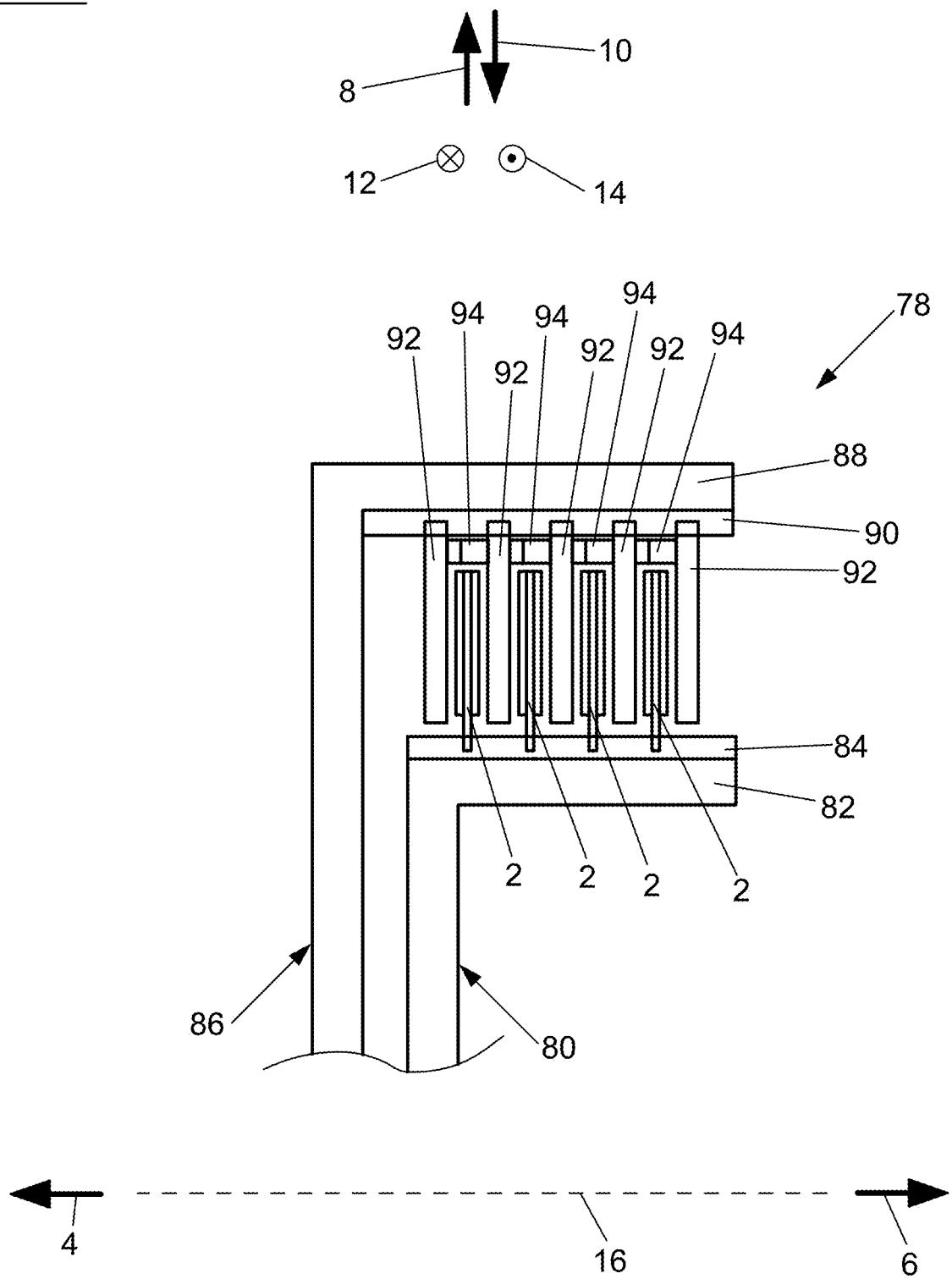

The invention will subsequently be explained in greater detail by means of exemplary embodiments with reference to the accompanying drawings. As shown in:

FIG. 1 a front view of a first embodiment of the friction disk according to the invention, FIG. 2 section A from FIG. 1 in an enlarged depiction, FIG. 3 a front view of a second embodiment of the friction disk according to the invention, FIG. 4 a partial side view of one embodiment of the frictionally acting device according to the invention in sectional depiction with at least one friction disk according to FIGS. 1 through 3.

FIGS. 1 and 2 show a first embodiment of friction disk 2 according to the invention. Friction disk 2 is designed as a disk for a disk clutch or disk brake, wherein a corresponding disk clutch is depicted in FIG. 4, which will be described again later in greater detail. In the figures, opposite axial directions 4, 6, opposite radial directions 8, 10, and opposite circumferential directions 12, 14 of friction disk 2 and the frictionally acting device in the form of a disk clutch to be described in greater detail are indicated by means of corresponding arrows, wherein friction disk 2 or the frictionally acting device is rotatable in circumferential directions 12, 14 about axis of rotation 16 extending in axial directions 4, 6.

Friction disk 2 has a disk body 18, formed as substantially annular, wherein disk body 18 is composed from a substantially annularly shaped friction lining carrier 20 and a friction lining 22 applied on a front side of friction lining carrier 20 facing in axial direction 4. Even if only the front side of friction disk facing in axial direction 4 is shown in FIG. 1, reference is made to the fact that a correspondingly designed friction lining is applied on the back side of friction lining carrier 20 facing away from the observer and facing in axial direction 6 so that the subsequent description of friction lining 22 also applies correspondingly for the friction lining on the back side of friction lining carrier 20, which thus likewise forms a part of disk body 18. Consequently, this is a friction disk 2, provided with a friction lining on both sides, wherein reference is made to the fact that the friction lining on the back side of friction lining carrier 20 might also be omitted in order to create a friction disk 2 provided with a friction lining 22 on one side, even if the embodiment with a friction disk 2 provided with friction lining 22 on both sides is preferred.

Disk body 18 has at least one friction section 24 projecting in axial direction 4 for forming a friction surface 26, which may be brought in axial direction 4 into frictional engagement with a counter disk. As is clear from FIG. 1, a plurality of friction sections 24 is thereby provided, between which the grooves are formed in friction surface 26, which will be described later in greater detail. Projecting friction sections 24 are formed by friction lining 22, stated more precisely, friction lining 22 is composed from a plurality of friction lining segments 28 spaced apart from each other, which each respectively form a projecting friction section 24 of disk body 18. Friction lining 22 or its friction lining segments 28 is/are preferably formed from a paper friction lining or from paper friction lining segments. Friction surface 26 is designed on disk body 18 as annularly encircling in circumferential direction 12, 14.

Friction lining carrier 20 of disk body 18 has a first edge 30 facing outward in radial direction 8 and a second edge 32 facing inward in radial direction 10 away from first edge 30, wherein a rotary driving contour 34 is provided on second edge 32. Rotary driving contour 34 functions for the rotationally fixed connection to a disk carrier of a frictionally acting device, as this is to be explained later again with reference to FIG. 4. Rotary driving contour 34 in the embodiment depicted is designed as an inner rotary driving contour 34 in radial direction 10, so that depicted friction disk 2 may also be referred to as a so-called inner disk. Rotary driving contour 34 itself is designed as a type of uniform toothing or inner toothing.

Friction surface 26, formed from the plurality of friction sections 24 and facing in axial direction 4, is designed as substantially annular and has a first friction surface edge 36 facing first edge 30 and facing outward in radial direction 8, and a second friction surface edge 38 facing second edge 32 and facing inward in radial direction 10. First friction surface edge 36 is slightly set back in radial direction 10 with respect to first edge 30 of friction lining carrier 20; however, it might also be designed as congruent with first edge 30. Second friction surface edge 38 has a substantially circular path in circumferential directions 12, 14 and is only interrupted by the openings at second friction surface edge 38, to be described later in greater detail. In the first embodiment, first edge 30 and first friction surface edge 38 have, in contrast, a path deviating from a circular path.

Both first edge 30 and also first friction surface edge 36 have an undulating, constant, and uniform path in circumferential direction 12, 14. In addition, both first edge 30 and also first friction surface edge 36 define with a circumferential circle 40 indicated by way of example in FIG. 2 an angle α at each point 42, stated more precisely, a smallest angle α at the respective point 42, which is less than 60°, wherein the mentioned angle α is preferably less than 45°, particularly preferably less than 30°. It should thereby be mentioned with reference to the path of second friction surface edge 38, that this is preferably designed as undulating and/or constant, disregarding the openings provided on second friction surface edge 38, which are described later in greater detail.

Due to the undulating path of first edge 30 and first friction surface edge 36, these each have a first section 44 curved inward toward friction surface 26 in radial direction 10 and second sections 46 curved away from friction surface 26 in radial direction 8, which follow each other alternating in circumferential direction 12 or 14. First sections 44 thereby each extend in circumferential direction 12, 14 across a first circumferential angle β, while second sections 46 each extend across a second circumferential angle γ in circumferential direction 12, 14, wherein the two circumferential angles β and γ are designed with different sizes. Stated more precisely, first circumferential angle β is larger than second circumferential angle γ, wherein first circumferential angle β is preferably at least twice, particularly preferably three times larger than second circumferential angle γ.

First and second sections 44, 46, curved in the previously described way, are designed as circular arcs. Thus, first sections 44 have a first circular arc radius $r_1$ and second sections 46 have a second circular arc radius $r_2$, wherein circular arc radii $r_1$ and $r_2$ are designed as different sizes. Stated more precisely, first circular arc radius $r_1$ is larger than second circular arc radius $r_2$, wherein first circular arc radius $r_1$ is preferably four times, particularly preferably five times larger than second circular arc radius $r_2$, as this is the case in FIG. 1 and FIG. 2.

Due to the described undulating path of first edge 30 of disk body 18 or of friction lining carrier 20, disk body 18 of friction lining carrier 20 has sections projecting in the radial direction, in this case outward in radial direction 8. Stated more precisely, first edge extends in an undulating fashion between a circumferential circle 48, lying outward in radial direction 8, and a circumferential circle 50, lying concentrically inward thereto in radial direction 10, wherein the two circumferential circles 48, 50 are indicated in FIG. 2. Consequently, the sections of disk body 18 or of friction lining carrier 20 projecting in radial direction 8 past circumferential circle 50 form the sections projecting in radial direction 8. As is clear in FIGS. 1 and 2, friction surface 26 is thereby designed at least partially in the region of the sections of disk body 18 or friction lining carrier 20 projecting past circumferential circle 50, in that friction lining segments 28 applied on friction lining carrier 20 extend past circumferential circle 50 in radial direction 8.

As already previously indicated, grooves are additionally designed in friction surface 26 extending between friction sections 24 formed by friction lining segments 28, wherein the groove bottom thereof is formed by friction lining carrier 20 due to the spacing of friction lining segments 28 from each other.

Thus, a circumferential groove 52 is provided in friction surface 26. Circumferential groove 52 extends substantially in circumferential directions 12, 14 continuously across friction surface 26 and is additionally closed in circumferential direction 12, 14, i.e., is designed as annular. Circumferential groove 52 thereby does not contact either first friction surface edge 36 or second friction surface edge 38. Circumferential groove 52 thereby extends in a zig-zag or undulating fashion between first deflection points 54 and second deflection points 56, as this is indicated, in particular, in FIG. 2. Second deflection points 56 are thereby farther removed in radial direction 8, 10 from first edge 30 and/or first friction surface edge 36 than first deflection points 54. Stated more precisely, first deflection points 54 in the embodiment depicted are designed as deflection points 54 lying outward in radial direction 8, while second deflection points 56 are designed as deflection points 56 lying inward in radial direction 10. Thus, circumferential groove 52 comprises a plurality of first groove segments 58, which extend in circumferential direction 12 from first deflection points 54 straight to second deflection points 56. In addition, circumferential groove 52 comprises a plurality of second groove segments 60, which extend in the same circumferential direction 12 from second deflection points 56 straight to first deflection points 54, so that a zig-zag shaped circumferential groove 52 is generated.

All first deflection points 54 are arranged on a common first circumferential circle 62, while all second deflection points 56 are arranged on a common second circumferential circle 64, wherein circumferential circles 62, 64 mentioned are in turn arranged concentrically to each other. The radius of first circumferential circle 62 is thereby designed as larger than the radius of second circumferential circle 64, given that first deflection points 54 are designed as deflection points lying outward in radial direction 8.

In addition, a plurality of first grooves 66, is provided in friction surface 26 which may be designated as outer first grooves 66, 68 lying in radial direction 8 with respect to circumferential groove 52. First grooves 66, 68 each have on the one side an opening 70, 72 at first friction surface edge 36 and open on the other side inward in radial direction 10 into circumferential groove 52. Furthermore, a plurality of second grooves 74 is provided in friction surface 26 which may be designated as inner second grooves 74 lying in radial direction 10 with respect to circumferential groove 52. Second grooves 74 each have on the one side an opening 76 at second friction surface edge 38 and open on the other side outward in radial direction 8 into circumferential groove 52. It is thereby clear from FIGS. 1 and 2 that first and second grooves 66, 68, 74 thereby open at different opening points along circumferential groove 52 into circumferential groove 52. In the embodiment depicted, first grooves 66, 68 open into circumferential groove 52 at first deflection points 54, and second grooves 74 at second deflection points 56.

First grooves 66 and second grooves 74 each extend substantially along a radial, wherein first grooves 66 are enlarged in the direction of opening 70, here outward in radial direction 8, while second grooves 74 likewise extend substantially along a radial, wherein second grooves 74 are enlarged in the direction of openings 76, here inward in radial direction 10. Openings 70 of first grooves 66 thereby have a larger groove cross section than openings 76 of second grooves 74. In contrast, two first grooves 68, 68 are respectively inclined with respect to a radial in directions opposite each other, such that they form common opening 72 at first friction surface edge 36. The groove cross section of common opening 72 of two first grooves 68 is thereby designed as smaller than the groove cross section of openings 70 of first grooves 66 and openings 76 of second grooves 74 at second friction surface edge 38. While common openings 72 are arranged in second section 46 of first edge 30 or of first friction surface edge 36, openings 70 of individual first grooves 66 are arranged in first section 44 of first edge 30 and/or of first friction surface edge 36. In addition, it is particularly clear from FIG. 1, that first grooves 68, 68, arranged in pairs adjacent to each other, or their common openings 72, and individual first grooves 66 or their openings 70 follow each other alternating in circumferential direction 12 or 14.

Groove segments 58, 60 of circumferential groove 52, joined together at first deflection points 54, form an angle $\delta_1$ on the side facing second edge 32 and second friction surface edge 38. Both first grooves 68, 68, joined at common opening 72, also form an angle $\delta_2$ on the side facing second edge 32 and second friction surface edge 38. Both angles $\delta_1$, $\delta_2$ lie between 55° and 80°, preferably between 60° and 75°, particular preferably between 64° and 71°. Angle $\delta_1$ between groove segments 58, 60 of circumferential groove 52 is also smaller than angle $\delta_2$ formed between both first grooves 68, 68 joined at common opening 72.

FIG. 3 shows a second embodiment of friction disk 2, which substantially corresponds to the first embodiment according to FIGS. 1 and 2, so that subsequently only the differences shall be addressed; identical reference numerals are used for identical or similar parts and otherwise the previous description correspondingly applies.

In contrast to the first embodiment, first edge 30 of disk body 18 or of friction lining carrier 20 has a circular path, while only first friction surface edge 36 has a path deviating from a circular path. In general, the previous statements regarding the first embodiment apply in a corresponding way for the second embodiment.

Even if not depicted, in another embodiment of friction disk 2, only first edge 30 of disk body 18 or of friction lining carrier 20 might have the path deviating from a circular path, described with reference to FIGS. 1 and 2, while first friction surface edge 36 has a circular path. In general, the statements regarding the first embodiment according to FIGS. 1 and 2 would also apply in a corresponding way to this third embodiment (not shown).

FIG. 4 shows an embodiment of a frictionally acting device 78 comprising at least one of the embodiments of a friction disk 2 described with reference to FIGS. 1 through 3. Frictionally acting device 78, depicted here in the form of a disk clutch, has a first disk carrier 80. First disk carrier 80, which is designed here as an inner disk carrier, has a first disk support section 82, provided with a rotary driving contour 84, which extends substantially in axial directions 4, 6. First rotary driving contour 84 on first disk support section 82 faces outward in radial direction 8. Thus, via first rotary driving contour 84, a plurality of friction disks 2 of the previously described type are connected rotationally fixed via their rotary driving contour 34 to first disk support section 82 of first disk carrier 80, wherein friction disks 2 are displaceable relative to first disk carrier 80 in axial direction 4, 6.

In addition, frictionally acting device 78 has a second disk carrier 86, which is designed here as an outer disk carrier. Second disk carrier 86 has a second disk support section 88, extending substantially in axial directions 4, 6, on whose side facing inward in radial direction 10 a second rotary driving contour 90 is provided. Via second rotary driving contour 90, a plurality of counter disks 92 are connected rotationally fixed to second disk support section 88 of second disk carrier 86, wherein counter disks 92 are also displaceable relative to second disk carrier 86 in axial direction 4, 6. Friction disks 2 and counter disks 92 are arranged relative to each other in such a way that they follow each other alternating in axial direction 4 or 6, so that friction surface 26 or friction surfaces 26, 26 on both sides of friction disk 2 may be brought into frictional contact with the corresponding friction surface on counter disks 92 in order to establish a rotary driving connection between first and second disk carrier 80, 86.

In addition to friction disk 2, a spring device 94, which functions for biasing two adjacently-arranged counter disks 92, 92 apart in order to ensure a safe separation of counter disks 92 and friction disks 2 in the open state of frictionally acting device 78, is also arranged in axial direction 4, 6 between respectively following counter disks 92. Spring device 94 is thereby preferably designed as a so-called wave spring, which is designed as encircling in circumferential direction 12, 14 and corrugated in axial direction 4, 6. Alternatively, however, other spring devices 94 are conceivable here, for example, disk springs or the like. Spring devices 94 are also arranged, regardless of their specific embodiment variant, in radial direction 8, 10 between disk support sections 82, 88, particularly preferably arranged completely therebetween. As is clear in FIG. 4, each friction disk 2 is arranged nested with a spring device 94 in radial direction 8, 10, wherein spring device 94 surrounds each friction disk 2 outwardly in radial direction 8 in the specifically depicted embodiment. First edge 30 and first friction surface edge 36 of each friction disk 2 thereby face spring device 94, here, outward in radial direction 8.

REFERENCE NUMERALS

2 Friction disk
4 Axial direction
6 Axial direction
8 Radial direction
10 Radial direction
12 Circumferential direction
14 Circumferential direction
16 Axis of rotation
18 Disk body
20 Friction lining carrier
22 Friction lining
24 Friction section
26 Friction surface
28 Friction lining segment
30 First edge
32 Second edge
34 Rotary driving contour
36 First friction surface edge
38 Second friction surface edge
40 Circumferential circle
42 Point
44 First sections
46 Second sections
48 Circumferential circle
50 Circumferential circle
52 Circumferential groove
54 First deflection points
56 Second deflection points
58 First groove segments
60 Second groove segments
62 First circumferential circle
64 Second circumferential circle
66 First grooves
68 First grooves
70 Opening
72 Common opening
74 Second grooves
76 Opening
78 Frictionally acting device
80 First disk carrier
82 First disk support section
84 First rotary driving contour
86 Second disk carrier
88 Second disk support section
90 Second rotary driving contour
92 Counter disks
94 Spring device
α Angle
β First circumferential angle
γ Second circumferential angle
$\delta_1$ Angle
$\delta_2$ Angle
$r_1$ First circular arc radius
$r_2$ Second circular arc radius

The invention claimed is:

1. A friction disk (2) for a frictionally acting device (78) comprising an annular disk-shaped disk body (18), which has a first edge (30), a second edge (32) facing away from the first edge (30) and with a rotary driving contour (34), and said disk body (18) having at least one friction section (24) projecting in an axial direction (4) for forming an annular friction surface (26) with grooves formed in said friction surface (26) and with a first friction surface edge (36) facing the first edge (30) and a second friction surface edge (38) facing the second edge (32), characterized in that one or both of the first edge (30) and the first friction surface edge (36) have a path deviating from a circular path and the first friction surface edge (36) is set back in a radial direction with respect to the first edge (30), wherein the first friction surface edge (36) comprises a radially outward most edge of the at least one friction section (24), and wherein the first edge (30) and the first friction surface edge (36) each have an undulating and/or constant path and/or forms an angle (α) at each point (42) with a circumferential circle (40), said angle being less than 60°.

2. The friction disk (2) according claim 1, characterized in that the first edge (30) and/or the first friction surface edge (36) has first sections (44) curved in radial direction (10; 8) toward the friction surface (26) and second sections (46) curved away from the friction surface (26), which follow each other alternating in circumferential direction (12, 14), wherein the first sections (44) extend across first circumferential angles (β) and the second sections (46) extend across second circumferential angles (γ), which are different sizes, and the first circumferential angle (β) is larger than the second circumferential angle (γ).

3. The friction disk (2) according to claim 2, characterized in that the first circumferential angle (β) is at least twice larger than the second circumferential angle (γ).

4. The friction disk (2) according to claim 2, characterized in that the first circumferential angle (β) is at least three times larger than the second circumferential angle (γ).

5. The friction disk (2) according to claim 2, characterized in that the first sections (44) and the second sections (46) are circular arcs, wherein the first sections (44) have a first circular arc radius (r1) and the second sections (46) have a second circular arc radius (r2), which are different sizes, and the first circular arc radius (r1) is larger than the second circular arc radius (r2).

6. The friction disk (2) according to claim 5, characterized in that the first circular arc radius (r1) is at least four times larger than the second circular arc radius (r2).

7. The friction disk (2) according to claim 5, characterized in that the first circular arc radius (r1) is at least five times larger than the second circular arc radius (r2).

8. The friction disk (2) according to claim 1, characterized in that said grooves in said friction surface (26) comprise a circumferential groove (52) which extends in a zig-zag or undulating fashion between first deflection points (54) and second deflection points (56) which are farther removed in the radial direction (8, 10) from the first edge (30) and/or the first friction surface edge (36) than the first deflection points (54), a plurality of first grooves (66, 68) which have an opening (70, 72) at the first friction surface edge (36) on the one side and open into the circumferential groove (52) on the other side, and a plurality of second grooves (74) which have an opening (76) at the second friction surface edge (38) on the one side and open into the circumferential groove (52) on the other side, wherein the first and second grooves (66, 68, 74) open into the circumferential groove (52) at different opening points.

9. The friction disk (2) according to claim 8, characterized in that at least two first grooves (68, 68) are provided with a common opening (72) at the first friction surface edge (36), wherein the common opening (72) is arranged in the second section (46), and individual first grooves (66) are provided, whose opening (70) at the first friction surface edge (36) is arranged in the first section (44), wherein the common openings (72) and the openings (70) of the individual first grooves (66) follow each other alternating in circumferential direction (12, 14).

10. The friction disk (2) according to claim 8, characterized in that the first deflection points (54) are arranged on a first circumferential circle (62) and the second deflection points (56) are arranged on a second circumferential circle (64), which are arranged concentric to each other, and/or the first grooves (66, 68) open into the circumferential groove (52) at the first deflection points (54) and the second grooves (74) at the second deflection points (56), and/or the common opening (72) has a smaller groove cross section than the opening (76) of the individual first groove (66) arranged in the first section (44) and/or than the openings (76) of the second grooves (74) arranged at the second friction surface edge (38).

11. The friction disk (2) according to claim 8, characterized in that groove segments (58, 60) of the circumferential groove (52), joined together at the first deflection points (54), also the two first grooves (68, 68) joined together at a common opening (72) form an angle (δ1, δ2) on the side facing the second edge (32) and/or the second friction surface edge (38), which angle lies between 55° and 80°, wherein the angle (δ1) defined between the groove segments (58, 60) is smaller than the angle (δ2) defined between the two first grooves (68, 68).

12. The friction disk (2) according to claim 11, characterized in that said angle (δ1, δ2) on the side facing the second edge (32) and/or the second friction surface edge (38) is between 60° and 75°.

13. The friction disk (2) according to claim 11, characterized in that said angle (δ1, δ2) on the side facing the second edge (32) and/or the second friction surface edge (38) is between 64° and 71°.

14. The friction disk (2) according to claim 8, characterized in that the first and second grooves (66, 68, 74) are open into the circumferential groove (52) at the deflection points (54, 56).

15. The friction disk (2) according to claim 1, characterized in that the disk body (18) has sections projecting in radial direction (8) due to the path of the first edge (30) deviating from a circular path, wherein the friction surface (26) is at least partially in the region of the projecting sections, and/or the disk body (18) has at least one axial projecting friction section (24) for forming the friction surface (26), wherein a plurality of friction sections (24) is provided, between which the circumferential groove (52), the first grooves (66, 68) and the second grooves (74) are formed, and the disk body (18) has a friction lining carrier (20) with the first and second edges (30, 32) and a friction lining (22) applied on the friction lining carrier (20) to form the at least one friction section (24), and the friction lining (22) is formed from a plurality of friction lining segments (28) separated from each other to form the plurality of friction sections (24).

16. A frictionally acting device (78) comprises a first disk carrier (80), on which at least one friction disk (2) is arranged, and a second disk carrier (86), on which at least one counter disk (92) is arranged which can be brought into frictional engagement with the at least one friction disk (2), characterized in that the at least one friction disk (2) is a friction disk (2) according to one of claim 1, or 2, or 4, or 6-9, and is arranged in an axial direction (4, 6) between two counter disks (92, 92), between which additionally a spring device (94), is arranged to bias the two counter disks (92, 92) apart, wherein the first edge (30) and/or the first friction surface edge (36) faces the spring device (94).

17. The friction disk (2) according to claim 1, characterized in that said angle is less than 45°.

18. The friction disk (2) according to claim 1, characterized in that said angle is less than 30°.

19. The friction disk (2) according to claim 1, characterized in that the first edge (30) and the first friction surface edge (36) each have an undulating path.

20. The friction disk (2) according to claim 1, characterized in that the first edge (30) and the first friction surface edge (36) each have a constant path.

* * * * *